United States Patent [19]

Higashide

[11] 3,858,010

[45] Dec. 31, 1974

[54] INTERMEDIATE COMMUNICATION LINK FOR USE IN ELECTRONIC SYSTEMS

[75] Inventor: Carlos S. Higashide, Elk Grove Village, Ill.

[73] Assignee: GTE Automatic Electric Laboratories Incorporated, Northlake, Ill.

[22] Filed: Apr. 6, 1973

[21] Appl. No.: 348,544

[52] U.S. Cl. ............................... 179/174, 179/78 R

[51] Int. Cl. ............................................ H04m 1/74

[58] Field of Search....... 179/174, 78 R, 98, 15 AN, 179/18 E, 18 ES

[56] References Cited

UNITED STATES PATENTS

| | | | |
|---|---|---|---|
| 2,008,061 | 7/1935 | Coolidge et al | 179/78 |
| 2,673,895 | 3/1954 | Stieltjes | 179/78 R |
| 3,517,123 | 6/1970 | Harr et al. | 179/18 ES |
| 3,767,863 | 10/1973 | Borbas et al. | 179/18 ES |

*Primary Examiner*—Thomas W. Brown

[57] ABSTRACT

An intermediate communication link which can be used for fast digital communication between electronic frames. The link uses twisted pair cables as a transmission media, and has a cable driven on the input thereof and a receiver on the output which permits the use of cables at least up to 50 feet in length.

6 Claims, 2 Drawing Figures

INTERMEDIATE COMMUNICATION LINK FOR USE IN ELECTRONIC SYSTEMS

This invention relates to an improved intermediate communication link, for use between electronic systems.

CROSS-REFERENCE TO RELATED APPLICATIONS

This invention is particularly related to and previously disclosed in U.S. patent application Ser. No. 320,398, filed Jan. 2, 1973, by James J. Vrba for a LINK ACCESSING ARRANGEMENT INCLUDING SQUARE-WAVE CLOCK GENERATOR.

It is further related to a PROCESSOR CONTROLLED COMMUNICATION SWITCHING SYSTEM, U.S. patent application Ser. No. 130,133, filed Apr. 1, 1971, by K. E. Prescher, R. E. Schauer and F. B. Sikorski, now abandoned, and a continuation-in-part thereof Ser. No. 342,323 filed Mar. 19, 1973, hereinafter referred to as the SYSTEM application. The system may also be referred to as No. 1 EAX or simply EAX.

The memory access, and the priority and interrupt circuits for the register-sender subsystem are covered by U.S. patent application Ser. No. 139,480, filed May 3, 1971, now U.S. Pat. No. 3,729,715 by C. K. Buedel for a MEMORY ACCESS APPARATUS PROVIDING CYCLIC SEQUENTIAL ACCESS BY A REGISTER SUBSYSTEM AND RANDOM ACCESS BY A MAIN PROCESSOR IN A COMMUNICATION SWITCHING SYSTEM, hereinafter referred to as the REGISTER-SENDER MEMORY CONTROL patent application. The register-sender subsystem is described in U.S. patent application Ser. No. 201,851, filed Nov. 24, 1971, now U.S. Pat. No. 3,737,873, by S. E. Puccini for DATA PROCESSOR WITH CYCLIC SEQUENTIAL ACCESS TO MULTIPLEXED LOGIC AND MEMORY, hereinafter referred to as the REGISTER-SENDER patent application. Maintenance hardware features of the register-sender are described in four U.S. patent applications having the same disclosure filed July 12, 1972, Ser. No. 270,909, now U.S. Pat. No. 3,784,801, by J. P. Caputo and F. A. Weber for a DATA HANDLING SYSTEM ERROR AND FAULT DETECTING AND DISCRIMINATING MAINTENANCE ARRANGEMENT, Ser. No. 270,910, now U.S. Pat. No. 3,783,255, by C. K. Buedel and J. P. Caputo for a DATA HANDLING SYSTEM MAINTENANCE ARRANGEMENT FOR PROCESSING SYSTEM TROUBLE CONDITIONS, Ser. No. 270,912, now U.S. Pat. No. 3,805,038, by C. K. Buedel and J. P. Caputo for a DATA HANDLING SYSTEM MAINTENANCE ARRANGEMENT FOR PROCESSING SYSTEM FAULT CONDITIONS, and Ser. No. 270,916, now U.S. Pat. No. 3,783,256, by J. P. Caputo and G. O'Toole for a DATA HANDLING SYSTEM MAINTENANCE ARRANGEMENT FOR CHECKING SIGNALS, these four applications being referred to hereinafter as the REGISTER-SENDER MAINTENANCE patent applications.

The marker for the system is disclosed in U.S. Pat. No. 3,681,537, issued Aug. 1, 1972, by J. W. Eddy, H. G. Fitch, W. F. Mui and A. M. Valente for a MARKER FOR COMMUNICATION SWITCHING SYSTEM, and U.S. Pat. No. 3,678,208, issued July 18, 1972, by J. W. Eddy for a MARKER PATH FINDING ARRANGEMENT INCLUDING IMMEDIATE RING;

and also in U.S. patent applications Ser. No. 281,586, filed Aug. 17, 1972, now U.S. Pat. No. 3,806,569, by J. W. Eddy for an INTERLOCK ARRANGEMENT FOR A COMMUNICATION SWITCHING SYSTEM, Ser. No. 311,606, filed Dec. 4, 1972, by J. W. Eddy and S. E. Puccini for a COMMUNICATION SYSTEM CONTROL TRANSFER ARRANGEMENT, Ser. No. 303,157, filed Nov. 2, 1972, now U.S. Pat. No. 3,809,822, by J. W. Eddy and S. E. Puccini for a COMMUNICATION SWITCHING SYSTEM INTERLOCK ARRANGEMENT, hereinafter referred to as the MARKER patents and applications.

The communication register and the marker transceivers are described in U.S. patent application Ser. No. 320,412, filed Jan. 2, 1973, now U.S. Pat. No. 3,814,859, by J. J. Vrba and C. K. Buedel for a COMMUNICATION SWITCHING SYSTEM TRANSCEIVER ARRANGEMENT FOR SERIAL TRANSMISSION, hereinafter referred to as the COMMUNICATIONS REGISTER patent application.

The above system, register-sender, marker and communication register patents and applications are incorporated herein and made a part hereof as though fully set forth.

BACKGROUND OF THE INVENTION

The purpose of this invention is to provide an economical means by which fast digital data and control signals may be transmitted and received reliably between electronic systems. The arrangement finds particular application in the above-mentioned No. 1 EAX electronic common control system.

Due to the fast data transfer rate requirement of five Megabits/second and the long transmission lengths involved in the subject EAX system, specialized circuitry is required. Available commercial units are of the differential driver and differential receiver type which require two power supply polarity (that is, +5 and −5 volts at the receiver) and the cost of these units is excessive.

Furthermore, for various reasons, it was desirous to use in the EAX system ordinary twisted pair cables of the type commonly used in telephone central offices as the transmission media. Exotic ribbon cables or miniature coaxial cables were ruled out because of the expense and specialized interconnect hardware requirements. Due to the close proximity of the twisted pair cables within a jacketed cable and the small noise immunity of the TTL gates, cross-talk from adjacent signal lines presented major problems. Ordinary TTL logic gates could not be used reliably as cable drivers and receivers, even when the transmission lines are perfectly terminated at the receiving end.

The intermediate communication link, or intermediate cable driver/receiver, of the present invention meets all of the above-mentioned requirements, and are used for digital communication between electronic frames, as more fully described below. The communication link uses twisted pair cables as a transmission media and can be used with cables up to 50 feet in length. The cables used have 15 transmission pairs bundled together in a very limp jacket.

Accordingly, it is an object of the present invention to provide an improved intermediate communication link, for use between electronic systems.

A further object is to provide such an intermediate communication link which provides an economical means by which fast digital data and control signals can be transmitted and received reliably.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENT

Figure 1:
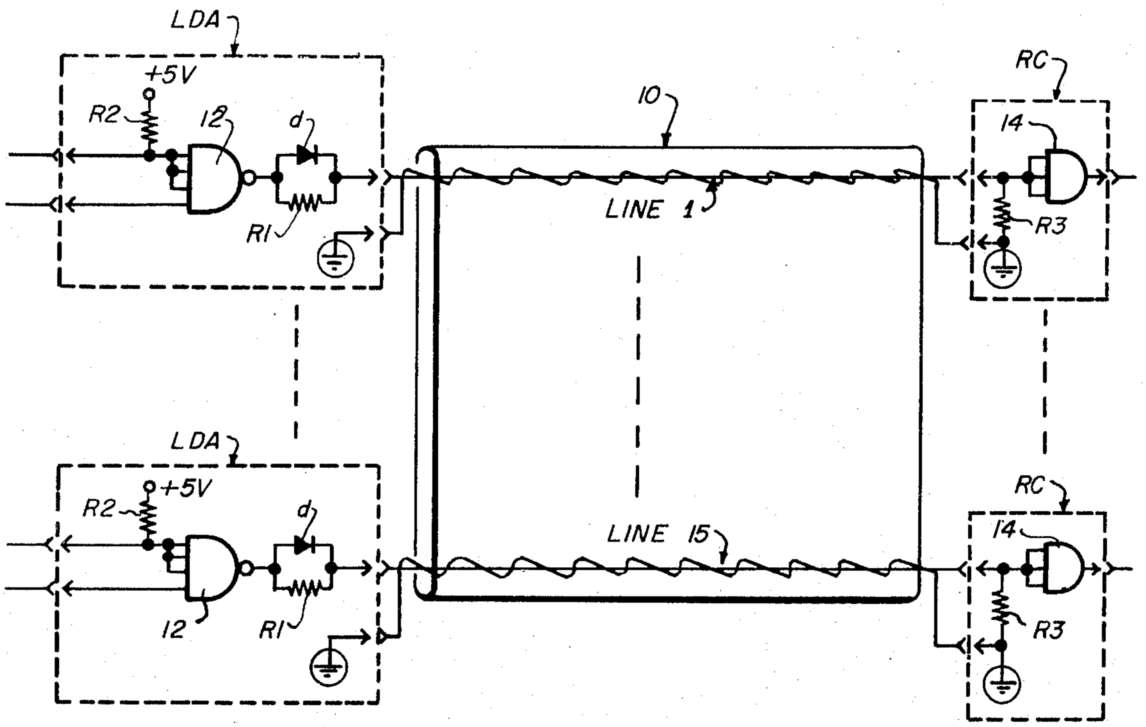
FIG. 1 is a schematic diagram illustrating the intermediate communication link.

Referring now to the drawing, in FIG. 1 there is illustrated an intermediate communication link used for digital communication between electronic frames (not shown) which, in the illustrated embodiment, is comprised of 15 transmission pairs or lines (only lines 1 and 15 being shown) bundled together in a cable jacket 10. A line driver circuit LDA is coupled to one end of each transmission line, and a receiver circuit RC is coupled to its opposite end. The transmission lines each is terminated to ground, at each of its opposite ends, as more fully described below.

Each of the line driver circuits LDA consists of a driver NAND gate 12 which preferably is a SUHL Line Driver (SG-132) sold by Sylvania, or its equivalent, with a parallel register R1, diode d network at its output. The SG-132 is preferred since it is a higher power unit than the usual logic gate and is able to drive 24 loads verses 6 loads for the normal logic gate. More particularly, the SG-132 is a dual high fan out driver and is a member of the SUHL family of logic elements, which is a monolithic, epitaxial, saturated high speed logic family. Each package contains two four-input AND gates followed by an inverting amplifier and functions as a NAND gate in positive logic (or as a NOR gate in negative logic). The SG-132 is designed for driving high fan out and high capacitive loads over the temperature range of 0°to 75°C without sacrificing speed and logic swing, or noise immunity.

Figure 2:
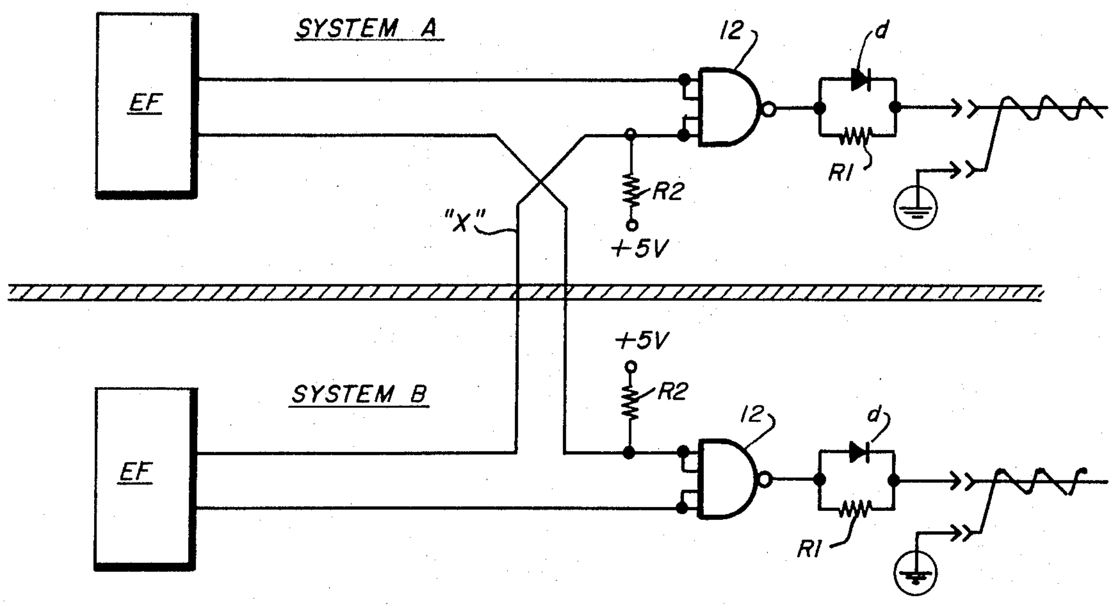
FIG. 2 is a partial schematic generally illustrating a duplicate system.

The driver gates 12 have a lead brought out which can be used for inhibit functions, and these inhibit leads have a 10k ohm resistor R2 wired to +5 volts to minimize driver noise sensitivity in a duplicated system, as illustrated in FIG. 2, as a result of failure in one of the systems.

For example, in FIG. 2, systems A and B are illustrated with outputs coupled from the electronic frames EF in these systems, to the driver gates 12 in the duplicate system as well as the driven gates within the system. Without the 10K ohm resistors R2, a failure in system B, for example, could leave line "X" electrically "floating," and the performance of the driver gate 12 in system A would also be degraded by the capacitance associated with line "X." The 10K ohm resistor, however, prevents this by holding the inhibit lead at logic 1. An example of a failure mode which would produce a "floating" line condition would be a power supply failure. If the inhibit lead is not used, it can simply be ignored.

The receiver circuits RC each consists of an AND gate 14 which preferably is a SUHL pulse shaper and delay gate (SG-83) manufactured and sold by Sylvania, or its equivalent, with the delay mode wired out and the inputs tied to ground via a 150 ohm resistor R3. The SG-83 is preferred since it has a "snap-action" output (Schmitt trigger action) and exhibits a hysteresis, as more fully described below.

Functionally, the SG-83 is made up of two distinct AND gates with each gate consisting of a three-input multiple-emitter AND element, a Schmitt trigger type circuit and a SUHL output network. Each AND gate has a point brought out to an external terminal. An external capacitor may be connected to this point to delay the AND function until this capacitor is charged through an internal 4K ohm resistor. However, as indiciated, this delay is wired out. This resistor is also brought out to allow external resistance coupling. The Schmitt trigger type circuit has a positive going threshold of approximately 1.4 volts, a negative going threshold of approximately 0.8 volts, and a hysteresis of approximately 0.8 volts. These trigger circuits drive typical SUHL output networks which provide high current and low voltage in the logic 0 state, and high current and voltage in the logic 1 state.

The sG-83 can be externally interconnected as a conventional logical AND gate with high positive and negative noise immunity (due to the hysteresis in the transfer characteristics) and with a nominal propagation delay of 12 nanoseconds. It can function as a pulse restorer, a line receiver, or a pulse shaper because of the regenerative nature of the Schmitt trigger and the hysteresis in the transfer characteristics. Also, input signals with long edges (up to 5 seconds rise and fall time) and/or noise can be restored to conventional digital logic signals. As a threshold detector, the regenerative Schmitt trigger type circuit will cause the output to snap to a logic 1 when the input signal rises to approximately 1.4 volts. The output will snap to logic 0 when the input falls to approximately 0.8 volts. This hysteresis gives a positive action for jitterless level detection.

Since the driver gate 12 is a NAND gate and the receiver gate 14 is an AND gate, the signal present at the output of the receiver gate 14 will be an inversion of the signal present at the input of the driver gate 12. A zero on the drive inhibit lead will force the driver output to a logic 1 inhibiting the signal present on the signal lead. The output of the receiver will, of course, be held at a logic 1 also.

The 150 ohm resistor R3 at the receiver input terminates the transmission line to eliminate most reflections. The resistor value is a compromise between the characteristic impedance of the transmission line and the logic 1 drive capability of the line drivers. Worst case analysis shows that the minimum logic 1 level using a terminating resistor matching the impedance of the transmission line would be of insufficient magnitude to tolerate the cross-talk encountered in the cable.

The diode resistor network (diode d and resistor R1) at the output of the driver gate 12 tends to match the output impedance of the driver gate in the logic 0 state to the characteristic impedance of the line and prevents cross-talk noise from being reflected back to the receiver gate 14. In the illustrated embodiment, the resistor R1 is 56 ohms, and was found empirically. The diode d is a germanium diode, and it shunts the resistor R1 to maintain a sufficiently high logic 1 level at the receiver.

The circuit response time is as follows:

| | TIME ON AND TIME OFF DELAY MINIMUM | DELAY MAXIMUM |
|---|---|---|
| line driver LDA | 4 n.s. | 25 n.s. |
| receiver circuit RC | 4 n.s. | 20 n.s. |

In addition, allowance must be made for the time required by a signal to propagate through the transmission line. The cable propagation time is approximately 1.75 n.s. per foot of cable. For worst case analysis, a tolerance of approximately ±15 percent is suggested.

The communication link preferably is a maximum of 50 feet or less. It is possible, however, to transmit information through a longer length of cable if proper allowance is made for pulse degradation and the ground shift between electronic frames is controlled.

Each driver gate 12 requires approximately 29 m.a. and each receiver gate 14 requires approximately 6 m.a. The driver gate 12 requires an abnormal amount of current for a SUHL gate because it must develop a logic 1 across the 150 ohm resistor R3.

A minimum amount of cross-talk results in the cable if all the signals in that cable go in the same direction. Accordingly, it is preferred that sending and receiving signals are not mixed within the same cable.

It will thus be seen that the objects set forth above among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. An intermediate communication link for digital communication between electronic frames within a communication system comprising:

a transmission cable comprised of a plurality of two wire transmission lines bundled together in a jacket;

a line driver and a receiver coupled respectively to the opposite ends of one said wires of each of said transmission lines;

each of said line drivers comprising gate means having a parallel diode resistor network in series with the output thereof;

each of said receivers comprising gate means having the inputs thereof tied to ground via resistance means; and the opposite ends of the other wire of each of said transmission lines being grounded.

2. The intermediate communication link of claim 1, wherein said parallel diode resistor network at the output of a line driver matches the output impedance of said line driver in the logic 0 state to the characteristic impedance of said transmission line to prevent cross-talk noise from being reflected back to said receivers.

3. The intermediate communication link of claim 2, wherein the diode of said parallel diode resistor network is a germanium diode and shunts the resistor thereof to maintain a sufficiently high logic 1 at said receiver.

4. The intermediate communication link of claim 1, wherein each of said line drivers comprises a NAND gate having a parallel diode resistor network at the output thereof for matching the output impedance of said line drivers in the logic 0 state to the characteristic impedance of said transmission lines and for preventing cross-talk noise from being reflected back to said receivers, the diode thereof being a germanium diode and shunting said resistor to maintain a sufficiently high logic 1 level at said receiver.

5. The intermediate communication link of claim 4, wherein each of said receivers comprises an AND gate having the inputs thereof tied to ground via resistance means, said resistance means being of a resistance value to eliminate most reflections.

6. The intermediate communication link of claim 1 wherein said two wires of each of said transmission lines comprises a twisted pair of wires.

* * * * *